United States Patent [19]

Isley

[11] 4,151,151

[45] Apr. 24, 1979

[54] FLOW IMPROVERS FOR HIGH NITRILE COPOLYMERS

[75] Inventor: Ralph Isley, Northfield, Ohio

[73] Assignee: The Standard Oil Company, Cleveland, Ohio

[21] Appl. No.: 870,053

[22] Filed: Jan. 16, 1978

[51] Int. Cl.² .............................................. C08K 5/09
[52] U.S. Cl. .............................. 260/30.4 N; 260/30.2; 260/32.6 N; 260/879; 526/3; 526/5; 526/6
[58] Field of Search ................................. 526/3, 5, 6; 260/30.4 N, 30.2, 45.8 NB, 45.9 NC, 45.8 A, 32.6 N, 879

[56] References Cited

U.S. PATENT DOCUMENTS

| | | | |
|---|---|---|---|
| 2,502,030 | 3/1950 | Scheiderbauer | 260/30.2 |
| 2,841,569 | 7/1958 | Rugg | 260/45.7 P |
| 3,314,914 | 4/1967 | Suling | 260/45.8 A |
| 3,539,524 | 11/1970 | Wilkinson | 260/32.6 N |
| 3,682,800 | 8/1972 | Miyama | 260/32.6 N |

*Primary Examiner*—Paul R. Michl
*Attorney, Agent, or Firm*—John F. Jones; Larry W. Evans

[57] ABSTRACT

Readily flowable thermoplastic high nitrile copolymer compositions which contain small amounts of certain polar organic chemicals, such as phthalic anhydride, are described.

11 Claims, No Drawings

FLOW IMPROVERS FOR HIGH NITRILE COPOLYMERS

This invention relates to improvement of the flow rate of thermoplastic copolymers of olefinic nitriles, and more particularly pertains to readily flowable thermoplastic high nitrile copolymer compositions which contain small amounts of certain polar organic chemicals which serve as internal lubricants.

According to my invention, certain polar chemicals in the medium-to-high melting-point range are dispersed in a weight ratio within the range of from about 5 to 20 parts by weight based on 100 parts by weight of high nitrile copolymer in a high nitrile polymer, copolymer, terpolymer or interpolymer to form easily flowable thermoplastic compositions. These compositions flow as much as 700% better than the nitrile copolymer itself and the novel mixtures have excellent physical properties.

The polar internal lubricants of the present invention are to be distinguished from known liquid plasticizers because the latter usually deteriorate physical properties such as tensile strength, heat-distortion temperature, and related properties.

Some of the internal lubricants embodied in the present invention have previously been used in acrylonitrile-fiber polymers in a weight ratio in the range of about 0.1 to 3% for the purpose of stabilizing the fibers against color formation during the solution and spinning operations. My invention is to be distinguished from this prior art in that the former employs much larger amounts of lubricant.

The polymers useful in this invention are those produced by polymerizing a major proportion of a monounsaturated nitrile, such as acrylonitrile, and a minor proportion of another monovinyl monomer component copolymerizable with said nitrile, in an aqueous medium optionally in the presence of a diene rubber which may be a homopolymer or a copolymer of a conjugated diene monomer.

The conjugated diene monomers useful in the present invention include butadiene, isoprene, chloroprene, bromoprene, cyanoprene, 2,3-dimethyl-butadiene, 2-ethyl-butadiene, 2,3-diethyl-butadiene, and the like, and others. Most preferred for the purposes of this invention are butadiene and isoprene because of their ready availability and their excellent copolymerization properties.

The olefinically unsaturated nitriles useful in this invention are the alpha-beta-olefinically unsaturated mononitriles having the structure

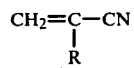

wherein R is hydrogen, a lower alkyl group having from 1 to 4 carbon atoms, or a halogen, Such compounds include acrylonitrile, alpha-chloroacrylonitrile, alpha-fluoroacrylonitrile, methacrylonitrile, ethacrylonitrile, and the like. The most preferred olefinically unsaturated nitriles are acrylonitrile and methacrylonitrile and mixtures thereof.

The other monovinyl monomer components copolymerizable with the olefinically unsaturated nitriles which are useful in this invention include one or more of the vinyl aromatic monomers, esters of olefinically unsaturated carboxylic acids, vinyl esters, vinyl ethers, alpha-olefins, indene, and others.

The vinyl aromatic monomers include styrene, alpha-methyl styrene, the vinyl toluenes, the vinyl xylenes, and the like. Most preferred is styrene.

The esters of olefinically unsaturated carboxylic acids include those having the structure

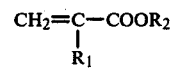

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred are methyl acrylate, ethyl acrylate, methyl methacrylate, and ethyl methacrylate.

The alpha-olefins useful in the present invention are those having at least b 4 and as many as 10 carbon atoms having the structure

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers useful in this invention include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

Vinyl esters useful in this invention include vinyl acetate, vinyl propionate, the vinyl butyrates, and the like. Most preferred is vinyl acetate.

The polymers useful in this invention are those prepared by the polymerization of 100 parts by weight of (A) from 60 to 90% by weight of at least one nitrile having the structure

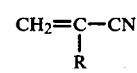

wherein R has the foregoing designation, and (B) from 10 to 40% by weight based on the combined weight of (A) plus (B) of at least one member selected from the group consisting of (1) styrene, (2) an ester having the structure

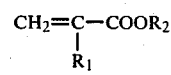

wherein $R_1$ and $R_2$ have the foregoing designations, (3) an alpha-olefin having the structure

wherein R' and R" have the foregoing designations, (4) a vinyl ether selected from the group consisting of methyl vinyl ether, ethyl vinyl ether, the propyl vinyl ethers, and the butyl vinyl ethers, (5) vinyl acetate, and (6) indene, in the presence of from 0 to 40 parts by weight of (C) a rubbery polymer of a conjugated diene monomer selected from the group consisting of butadiene and isoprene and optionally at least one comonomer selected from the group consisting of styrene, a nitrile monomer having the structure

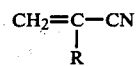

wherein R has the foregoing designation, and an ester having the structure

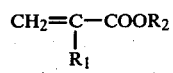

wherein $R_1$ and $R_2$ have the foregoing designations, said rubbery polymer containing from 50 to 100% by weight of polymerized conjugated diene and from 0 to 50% by weight of comonomer.

The polar organic materials which are useful as internal lubricants in the present invention include phthalic anhyride, succinic anhydride, glutaric anhydride, 1,2,4-benzene tricarboxylic anhydride, pyromellitic dianhydride, trimellitic anhydride, succinimide, glutarimide, phthalimide, saccharin (o-benzoyl sulfimide), adipamide, phthalic amide, salicyl amide, acetyl salicylamide, n-acetyl salicylamide, succinimide, urea, dibutyl urea, and dibutyl thiourea. Most preferred for the purposes of this invention are phthalic anhydride, succinic anhydride, succinimide, salicyl amide, glutaric anhydride, adipamide, phthalimide, and saccharin.

The internal lubricants can be dispersed in the high nitrile copolymer resins of this invention in any one of a number of ways which are well known to those skilled in the art. The dispersions can be made in an extruder, an internal mixer such as a Banbury or Brabender, and the dispersion can also be made by adding the lubricant to the polymer latex or dispersion or solution. Dispersions can also be made by adding the lubricant to the powdered oil-granular resin in a high-speed mixer.

The compositions produced by following the disclosure of the present invention are useful thermoplastic materials which can be molded into containers, pipes, rods, films, sheets, fibers, and the like, to be used for packaging, storing and transporting solids, liquids and gases of various types.

This invention is further illustrated in the following examples wherein the amounts of ingredients are expressed in parts by weight unless otherwise indicated.

EXAMPLE 1

A. A graft copolymer was prepared by polymerizing 75 parts of acrylonitrile and 25 parts of methyl acrylate and an acrylonitrile-butadiene rubber as described in Example 1A and B of U.S. Pat. No. 3,426,102. The resulting resin was found to have a melt index (ASTM D-1238) of 2.74 grams per 10 minutes. This resin was also found to have an ASTM D-790 flexural strength of $14.7 \times 10^3$ psi, an ASTM D-790 flexural modulus of $4.77 \times 10^5$ psi and an ASTM D-638 tensile strength of $9.10 \times 10^3$ psi.

B. A resin which is outside the scope of this invention was prepared by thoroughly mixing 100 parts of the resin described in A of this example with 1 part of phthalic anhydride on a roll mill at a temperature in the range of 320°–350° C. The resulting mixture was found to be similar to A in that it had a melt index of 3.27 grams per 10 minutes, a flexural strength of $14.5 \times 10^3$ psi, a flexural modulus of $4.9 \times 10^5$ psi and a tensile strength of $8.95 \times 10^3$ psi.

C. A resin which is within the scope of this invention was prepared by thoroughly mixing 5 parts of phthalic anhydride with 100 parts of resin A of this example on a roll mill at 320°–350° F. The resulting mixture was found to have a melt index of 4.45 grams per 10 minutes, a flexural strength of $15.3 \times 10^3$ psi, a flexural modulus of $4.92 \times 10^5$ psi and a tensile strength of $9.04 \times 10^3$ psi.

D. C of this example was repeated except that 10 parts of phthalic anhydride were used. The resulting mixture had a melt index of 7.16 grams per 10 minutes, a flexural strength of $14.7 \times 10^3$ psi, a flexural modulus of $5.07 \times 10^5$ psi and a tensile strength of $8.56 \times 10^3$ psi.

E. The procedure of C above was followed except that 20 parts of phthalic anhydride were used. The resulting mixture had a melt index of 19.5 grams per 10 minutes, a flexural strength of $12.6 \times 10^3$ psi, a flexural modulus of $4.85 \times 10^5$ psi and a tensile strength of $7.50 \times 10^3$ psi.

EXAMPLE 2

The procedure of Example 1D was repeated using 10 parts of succinic anhydride in place of the phthalic anhydride, and the resulting mixture had a melt index of 7.4 grams per 10 minutes.

EXAMPLE 3

The procedure of Example 1D was followed except that the phthalic anhydride was replaced with 10 parts of succinimide. The resulting mixture was found to have a melt index of 15.9 grams per 10 minutes.

EXAMPLE 4

The procedure of Example 1C was followed except that 5 parts of succinimide were included along with the 5 parts of phthalimide. The resulting resin had a melt index of 13.6 grams per 10 minutes.

EXAMPLE 5

The procedure of Example 1D was repeated using salicyl amide in place of the phthalic anhydride. The resulting resin mixture had a melt index of 10.9 grams per 10 minutes.

EXAMPLE 6

The procedure of Example 1D was repeated using glutaric anhydride in place of the phthalic anhydride. The resulting resin had a melt index of 5.8 grams per 10 minutes.

EXAMPLE 7

The procedure of Example 1D was repeated using adipamide in place of phthalic anhydride. The resulting resin had a melt index of 8.1 grams per 10 minutes.

EXAMPLE 8

A. A copolymer of 75:25 acrylonitrile:methyl acrylate was found to have a melt index of 6.8 grams per 10 minutes.

B. A mixture of 100 parts of A of this example and 10 parts of phthalic anhydride was found to have a melt index of 19.6 grams per 10 minutes.

EXAMPLE 9

A. A copolymer of 70:22:8 parts, respectively, of acrylonitrile:styrene:methyl acrylate was prepared and found to have a melt index of 0.182 gram per 10 minutes.

B. A mixture of 100 parts of A of this example and 10 parts of phthalic anhydride was found to have a melt index of 0.715 gram per 10 minutes.

EXAMPLE 10

The procedure of Example 1D was repeated except that saccharin was used in place of the phthalic anhydride. The resulting resin was found to have a melt index of 8.3 grams per 10 minutes.

EXAMPLE 11

The procedure of Example 1D was repeated except that phthalimide was used in place of the phthalic anhydride. The resulting resin was found to have a melt index of 11.2 grams per 10 minutes.

I claim:

1. The composition which comprises an intimate mixture of 100 parts by weight of
   (I) a polymer prepared by the polymerization in an aqueous medium of 100 parts by weight of
   (A) from 60 to 90% by weight of at least one nitrile having the structure $$CH_2=C-CN$$
   $$\quad\ |$$
   $$\quad\ R$$

wherein R is hydrogen, a lower alkyl group having from 1 to 4 carbon atoms, or a halogen, and
   (B) from 10 to 40% by weight based on the combined weight of (A) plus (B) of at least one member selected from the group consisting of
   (1) styrene,
   (2) an ester having the structure $$CH_2=C-COOR_2$$
   $$\quad\ |$$
   $$\quad\ R_1$$

wherein $R_1$ is hydrogen, an alkyl group having from 1 to 4 carbon atoms, or a halogen, and $R_2$ is an alkyl group having from 1 to 6 carbon atoms,
   (3) an alpha-olefin having the structure $$CH_2=C$$
   $$\quad |$$
   $$\quad R''$$
   with R' above wherein R' and R'' are alkyl groups having from 1 to 7 carbon atoms,
   (4) a vinyl ether selected from the group consisting of methyl vinyl ether, ethyl vinyl ether, the propyl vinyl ethers, and the butyl vinyl ethers,
   (5) vinyl acetate, and
   (6) indene,
   in the presence of from 0 to 40 parts by weight of
   (C) a rubbery polymer of a conjugated diene monomer selected from the group consisting of butadiene and isoprene and optionally at least one comonomer selected from the group consisting of styrene, a nitrile monomer having the structure $$CH_2=C-CN$$
   $$\quad\ |$$
   $$\quad\ R$$

wherein R has the foregoing designation, and an ester having the structure $$CH_2=C-COOR_2$$
   $$\quad\ |$$
   $$\quad\ R_1$$

wherein $R_1$ and $R_2$ have the foregoing designations, said rubbery polymer containing from 50 to 100% by weight of polymerized conjugated diene and from 0 to 50% by weight of comonomer,
   and from about 5 to 20 parts by weight of
   (II) a polar organic material selected from the group consisting of glutaric anhydride, phthalimide, saccharin, adipamide, salicyl amide, and succinimide.

2. The composition of claim 1 wherein (A) is a member selected from the group consisting of acrylonitrile and methacrylonitrile.

3. The composition of claim 2 wherein (A) is acrylonitrile.

4. The composition of claim 3 wherein (B) is methyl acrylate.

5. The composition of claim 3 wherein (B) is a mixture of methyl acrylate and styrene.

6. The composition of claim 5 wherein II is succinimide.

7. The composition of claim 5 wherein II is salicyl amide.

8. The composition of claim 5 wherein II is glutaric anhydride.

9. The composition of claim 5 wherein II is adipamide.

10. The composition of claim 5 wherein II is phthalimide.

11. The composition of claim 5 wherein II is saccharin.

* * * * *